(No Model.) 3 Sheets—Sheet 1.

T. WILLIAMS, Jr.
COMBINED MEAT MINCING AND SAUSAGE STUFFING MACHINE.

No. 347,408. Patented Aug. 17, 1886.

Witnesses.
Harry Y. Davis
W. A. Redmond

Inventor.
Thomas Williams Jr
by Wm. H. Finckel
his atty.

(No Model.) 3 Sheets—Sheet 2.

T. WILLIAMS, Jr.
COMBINED MEAT MINCING AND SAUSAGE STUFFING MACHINE.

No. 347,408. Patented Aug. 17, 1886.

Witnesses:
Harry Y. Davis
W. A. Redmond

Inventor:
Thomas Williams Jr.
by Wm. N. Finckel
his Atty.

(No Model.)  3 Sheets—Sheet 3.

T. WILLIAMS, Jr.
COMBINED MEAT MINCING AND SAUSAGE STUFFING MACHINE.

No. 347,408. Patented Aug. 17, 1886.

Witnesses.
Harry Y. Davis
W. A. Redmond

Inventor
Thomas Williams Jr.
by Wm H. Finckel
his Atty.

N. PETERS, Photo-Lithographer, Washington, D. C.

UNITED STATES PATENT OFFICE.

THOMAS WILLIAMS, JR., OF 45 MYDDELTON SQUARE, COUNTY OF MIDDLESEX, ENGLAND.

COMBINED MEAT-MINCING AND SAUSAGE-STUFFING MACHINE.

SPECIFICATION forming part of Letters Patent No. 347,408, dated August 17, 1886.

Application filed April 13, 1886. Serial No. 198,734. (No model.) Patented in England February 13, 1885, No. 2,020.

*To all whom it may concern:*

Be it known that I, THOMAS WILLIAMS, Jr., a subject of Her Majesty the Queen of Great Britain and Ireland, residing at 45 Myddelton Square, in the county of Middlesex, England, engineer, have invented a new and useful Improved Combined Meat-Mincing and Sausage-Filling Machine, (for which I have obtained a patent in Great Britain, No. 2,020, bearing date February 13, A. D. 1885,) of which the following is a specification.

My invention relates to a combined meat-mincing and sausage-filling machine, in which I combine together (on one and the same bed-plate, so as to form a single combined machine) a meat-mincer of the kind consisting of knives rotating vertically within a slowly-revolving horizontal bowl, a filler or stuffing-machine of any well-known kind, but preferably consisting of an Archimedean screw revolving within a convenient casing provided with a filling-nozzle, and an automatic feeding device for feeding or discharging the meat, after it has been minced, direct from the revolving bowl of the mincer into the hopper of the filler, the whole being driven or actuated either by hand or by power from a single driver; and the objects of my improvements are, first, to provide a cheaper, more simple, and compact machine, complete in itself for cutting and mincing meat, and for filling the same into sausage-skins, in lieu of requiring two separate and distinct machines, each driven separately, for carrying out those operations; secondly, to avoid all handling of the minced meat by the attendant between the operations of mincing and filling; and, thirdly, to afford facility for the proper securing and adjustment of the knives on the knife-shaft independently of each other. I attain these objects by the mechanism illustrated in the accompanying drawings, in which—

Figure 1:
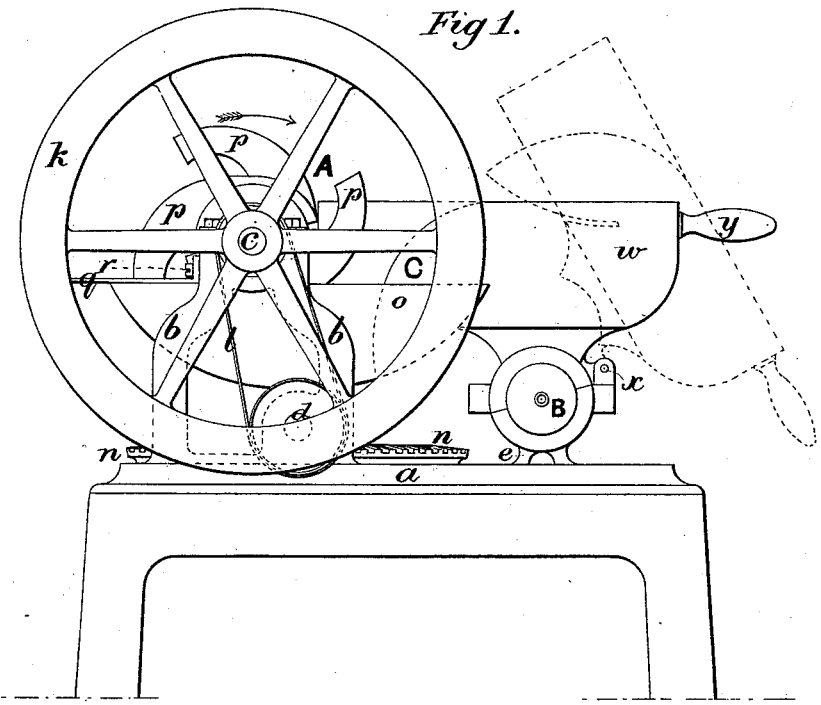
Figure 2:
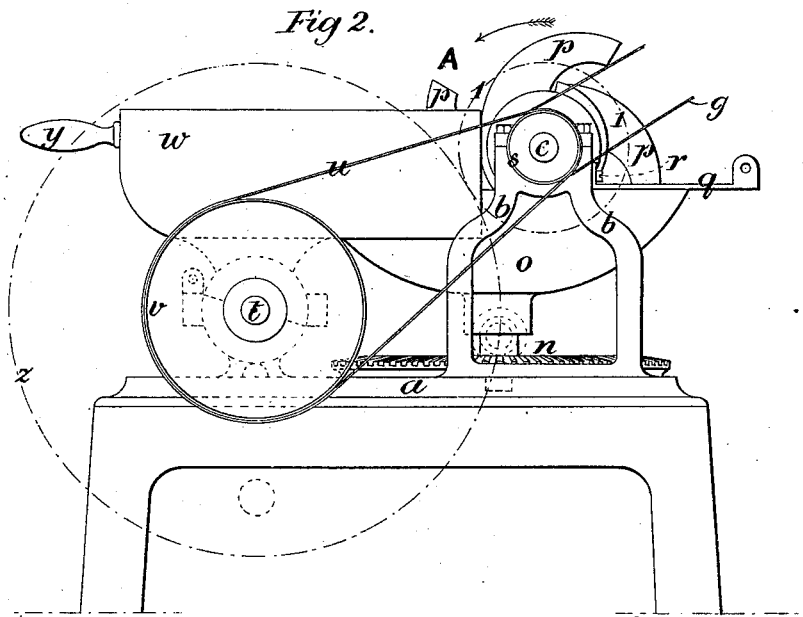
Figure 3:
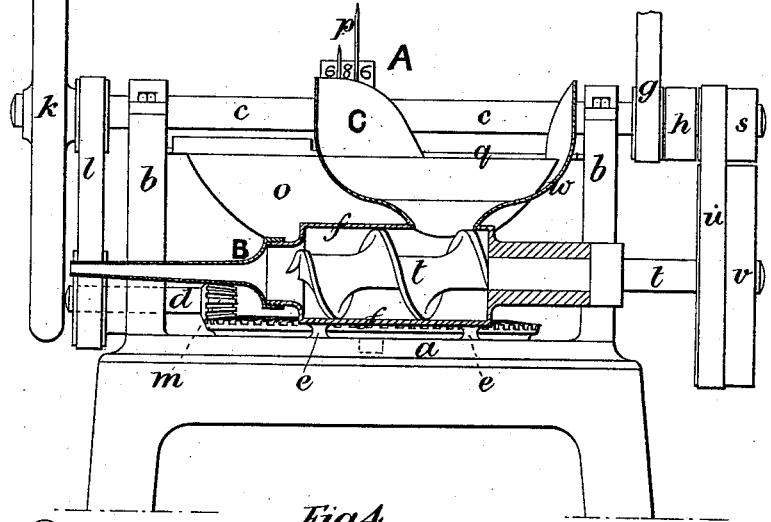
Figure 4:
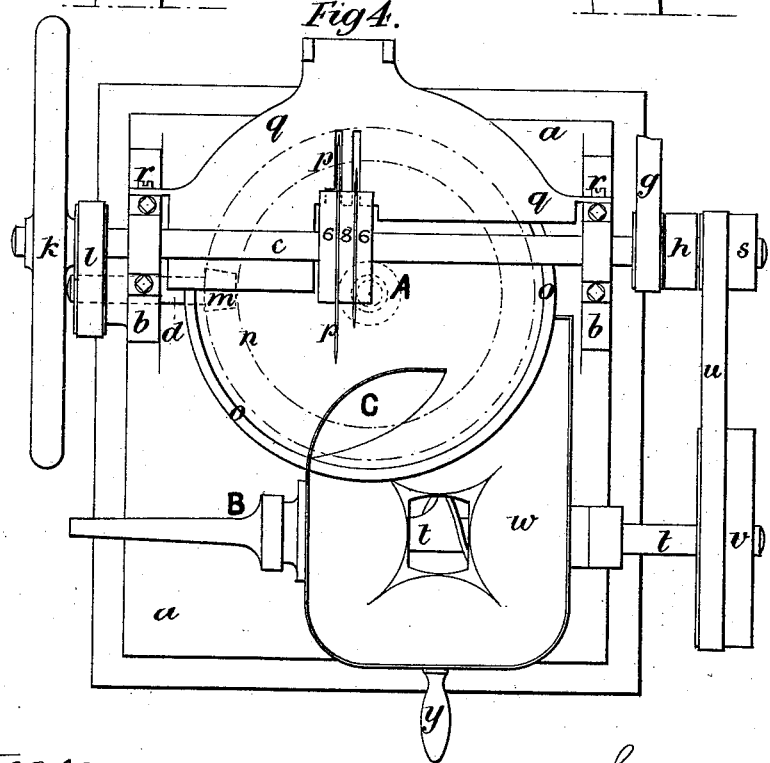
Figure 5:
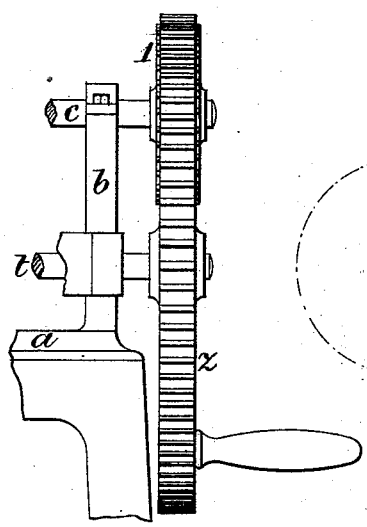
Figure 6:
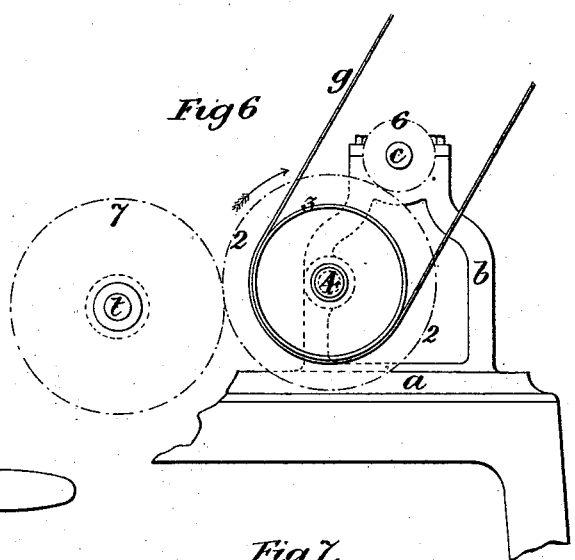
Figure 7:
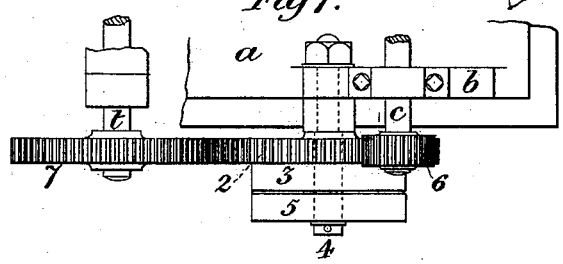
Figure 8:
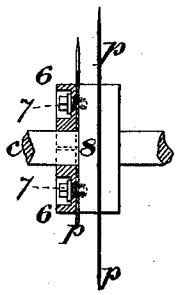
Figures 9, 10:
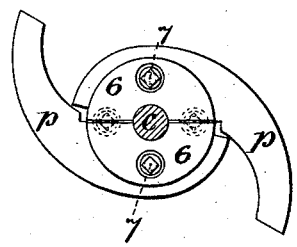

Figure 1 is an end elevation of my improved combined machine arranged to be driven by power. Fig. 2 is an elevation, looking on the opposite or driving end of the machine. Fig. 3 is a front elevation of the combined machine, showing the filling device in longitudinal section. Fig. 4 is a plan corresponding to Fig. 3. Fig. 5 is a detail front elevation of a portion of the combined machine as arranged for being driven by hand. Fig. 6 is a detail side elevation of the modification for driving both the knife-shaft of the mincer and the spindle of the filler of the combined machine from an intermediate driver common to the two. Fig. 7 is a plan of the same. Fig. 8 is a detail edge view and partial vertical section, on a larger scale, of a mode of securing the knives of the mincer to the knife-shaft. Fig. 9 is a side elevation thereof, and Fig. 10 is a detail of one of the knives detached.

Similar letters refer to similar parts throughout the several views.

A is the mincer; B, the filler, and C the automatic feeding device, consisting of a combined plow or scraper and duct contained at one end inside the bowl of the mincer, and communicating at the outer end direct with the hopper of the filler, all of which parts constitute the essential elements of the combined machine, and are carried on one and the same bed-plate, $a$. For cheapness of construction this bed-plate is cast in one with the supports $b\ b$, carrying the bearings of the knife-shaft $c$, and the bowl-actuating spindle or shaft $d$, also with the supports $e\ e$ for the casing $f$ of the filler.

$g$ is the main or first driving-strap, mounted on a pair of fast and loose driving-pulleys, $h$, on the knife-shaft $c$, which carries a fly-wheel, $k$, and a pulley and strap, $l$, or gearing for transmitting motion to the short horizontal spindle $d$, for rotating the bowl $o$. This spindle $d$ carries a bevel-pinion, $m$, in gear with a horizontal bevel-wheel, $n$, situate above the bed-plate, the axis of which wheel constitutes the vertical axis of the revolving bowl $o$, and turns in a foot-step in the bed-plate $a$.

$p\ p$ are the rotary curved knives of the mincer, working inside the bowl in the well-known manner. $q$ is the cover-plate to the bowl, made in one piece, and attached at $r$ to the pillow-blocks of the knife-shaft bearings, so as to be readily removable when required. The said knives work through slits in the cover-plate, as usual, and are protected by the usual hood or fence, as is well understood.

The following is the mode of driving by power: $s$ is a pulley for transmitting motion direct from the knife-shaft (driven by the single driving-strap $g$ and pulley $h$) to the spindle of the Archimedean screw $t$ of the filler through the strap $u$ and fast and loose pulleys $v$, the shifting of the said strap enabling the filler to be thrown into or out of action as required. Toothed gearing may be substituted for the strap $u$, for transmitting motion from the knife-shaft to the Archimedean screw of the filler. When arranged for being driven by hand, I prefer that the spindle or shaft $t$ of the filler should constitute the first-motion shaft of the combined machine, mounting thereon a spur-wheel, $z$, provided with a handle, and gearing into a smaller spur-wheel, 1, fast on the knife-shaft, as shown in the detail, Fig. 5, and also shown by the correspondingly-lettered dotted pitch-lines $z$ and 1 in Fig. 2. In this case the driving-wheel $z$ may be mounted loose on the shaft $t$ and coupled therewith by any well-known clutch arrangement, so as to enable the filler to be thrown out of action while the mincer is still being worked. When driven by power, I prefer that the knife-shaft should constitute the driving-shaft, as shown in Figs. 2, 3, and 4, and be driven at the rate of, say, three revolutions to one of the expelling-screw of the filler. When the screw-shaft of the filler constitutes the first-motion shaft, or is geared direct to the knife-shaft in the manner shown in dotted pitch-lines in Fig. 2 and in detail edge view in Fig. 5, the thread of the screw will necessarily be in the reverse direction to that shown in Fig. 3, where a strap, $u$, is employed. In lieu of making either the knife-shaft $c$ of the mincer or the Archimedean spindle $t$ of the filler (as the case may be) the driving-shaft, and transmitting the motion from the one to the other, I may drive both these shafts simultaneously from a single intermediate driver common to the two, as shown in Figs. 6 and 7, said intermediate driver consisting of a gear-wheel, 2, and driving-pulley 3, mounted loose together on a stud-pin, 4, which may also carry a separate loose pulley, 5, the said gear-wheel 2 gearing with corresponding gears, 6 and 7, mounted, respectively, on the knife-shaft $c$ of the mincer and spindle $t$ of the Archimedean screw of the filler.

The hopper $w$ of the filler is separately hinged at $x$ to the upper part of the casing of the filler, which is made removable, as is well understood; but a portion of this hopper is extended over the edge of and down into the interior of the bowl of the mincer, so as to form an inclined plow or scraper, C, and guiding-duct, which guides the minced meat, assisted by the rotary action of the bowl, upward and over the edge of the bowl direct into the feed-hopper of the filler.

In Fig. 1 I have shown in dotted lines the automatic feeding device and hopper in the position they would occupy when turned up out of action by depressing the handle $y$, formed on the hopper.

The knives may be secured to the knife-shaft of the mincer in a similar manner to that described in the specification to my British patent of February 19, 1880, No. 732; but in order to enable any single knife of the series to be removed or adjusted without loosening any of the rest, I pass each fixing-screw through an outer loose collar situate on each side of a fixed collar or boss on the knife-shaft, said screw passing through its own particular knife, and into, but not so as to project beyond, the said fixed collar. When the said outer loose collars are in the form of complete rings surrounding the shaft, and contain two or more screws for securing two or more knives, it frequently happens that the loosening of one screw loosens more or less the other knife or knives held by the same loose collar, and therefore I divide the said loose collars diametrically into two separate halves, each half having only one countersunk screw therein corresponding to its own particular knife; hence the one knife and half-collar can be slackened without interfering with the corresponding half-collar and knife connected therewith.

6 6 in Figs. 8 and 9 represent the outer divided or semicircular collars for holding the knives $p$ in position on the knife-shaft by screws 7, passing through the said half-collars and corresponding knives and entering a short distance into the fixed collar 8 of the shaft, as shown. The knives are by preference each formed with an open rectangular slot, 9, (see Fig. 10,) in order to admit of a single knife being readily removed and replaced on slackening its corresponding screw without disturbing the rest.

The knives may either be disposed in pairs, so that two knives of the series shall always be cutting simultaneously, or they may be arranged, as shown in my drawings annexed, so as to cut singly in succession.

What I claim, and desire to secure by Letters Patent of the United States, is—

1. A mincer comprising a revolving bowl and a filler, combined with an interposed scraper or plow, C, projecting into the said bowl to transfer the minced stuff into the filler, substantially as described.

2. The combination, substantially as shown and described, of a bed-plate, $a$, shafts $c$, $d$, and $t$, arranged in supports rising from such bed-plate, gearing connecting said shafts so as to properly drive them, a mincing mechanism comprising knives and a revolving bowl, a filler, and a feeder plow or scraper, C, for automatically taking the minced meat from the bowl of the mincing mechanism and delivering it to the filler, as set forth.

3. The combination, with the knife-shaft and knives thereon, and a collar, 8, fixed on said shaft, against which the knives are applied, of the segmental detachable collars 6, superposed upon the knives, and screws 7, passed through the segmental collars and knives into the fixed collar, to separately secure each knife and permit its removal without thereby affecting the other knives, substantially as set forth.

In witness whereof I have signed my name in the presence of two subscribing witnesses.

THOMAS WILLIAMS, JR.

Witnesses:
F. J. RAPSON,
36 *Southampton Bdgs., London, W. C.*
HERBERT E. DALE,
17 *Gracechurch Street, London, E. C.*